Patented June 25, 1935

2,006,259

UNITED STATES PATENT OFFICE 2,006,259

ZINC SULPHIDE AND PROCESS OF MAKING THE SAME

John Henry Calbeck, Joplin, Mo., assignor to American Zinc, Lead & Smelting Company, St. Louis, Mo., a corporation of Maine No Drawing. Application September 6, 1933, Serial No. 688,413

26 Claims. (Cl. 134—78)

This invention relates to a new and superior zinc sulphide pigment and process for making the same. The essential properties of white pigment are: Color or whiteness, color strength or whitening power, hiding power, durability and a satisfactory behavior when ground in oil. There are only a few substances that possess the property of color strength or hiding power to an extent that renders them valuable as paint pigments.

The crude zinc sulphide pigment produced by the present invention has a color strength equal to that of the high strength lithopones and this pigment if dehydrated by appropriate calcination, as herein described, exhibits a color strength equal to titanium dioxide, or approximately 70% greater than ordinary commercial zinc sulphides. Heretofore two methods have been employed for the commercial production of zinc sulphide pigments: 1, furnace methods wherein zinc oxide is calcined with sulphur to produce zinc sulphide, and 2, precipitation, followed by calcination. So far as I am informed, only the latter method is now in commercial use. Briefly described, this method is as follows:

A water-soluble zinc salt reacts in solution with a water-soluble salt of an alkali or alkaline earth metal to precipitate zinc sulphide. For example:

$$ZnCl_2 + BaS = ZnS + BaCl_2$$

By this process the zinc sulphide is precipitated immediately the two solutions are brought in contact and the solid particles so formed are extremely fine, perhaps ten fold finer than is required for pigment purposes. In order to facilitate washing and filtering of the pigment it is found advisable to agitate the mixed solutions very gently in order that these extremely fine primary particles may form flocculates which settle more rapidly in the pulp and may be filtered more readily. After the precipitate is washed, filtered and dried, it is necessary to calcine it in order to develop the required pigment properties. This calcination results: 1. The water of hydration is driven off; 2. The aggregates of small particles are sintered together to produce a particle size conducive to a sufficient color strength and hiding power; 3. Better color and brightness are developed. After calcination the product is hard and gritty and while yet red hot is quenched in cold water. The slurry so formed is passed through pebble mills to break down aggregates that have become too large in the calcination process. The pulp is again washed with water, filtered and dried, and the dry filter cake is pulverized in a mill and the pigment is ready for use. From one to six hours is required to calcine a zinc sulphide to a sufficient color strength, and this is largely for the purpose of building up particle size of the pigment, the dehydration usually being completed in a relatively short time. Individual particles of commercial zinc sulphide produced by this old process are aggregates of small particles sintered together and do not possess the uniformity of size, shape and crystalline form that is conductive to maximum strength.

The present invention is based on the discovery that when zinc sulphide is precipitated from a solution of a zinc salt by means of thiosulphate (rather than by sulphide ion as is the common practice) it possesses a high degree of uniformity of size, shape and crystalline form, and that the precipitation can be controlled to produce a particle size and uniformity that is conductive to a sufficient color strength and hiding power without the necessity of calcining. The zinc sulphide so produced has excellent color, brightness and durability, and has a soft velvety texture, and is radically different from the crude or uncalcined zinc sulphides heretofore produced and which cannot be used successfully in paint. Furthermore, if this new zinc sulphide of the present invention be dehydrated by appropriate calcining, the color strength will be greatly improved and will excel ordinary zinc sulphides by as much as 70 per cent in color strength.

The present invention includes both the general method of precipitating zinc sulphide by means of thiosulphates and also the means whereby precise control of the particle size, uniformity and crystalline form of the precipitate is maintained. If concentrated solutions of zinc sulphate and sodium thiosulphate are brought to boiling and then rapidly mixed, no precipitate will form at first, but after a few seconds (the induction period) a faint cloudiness will appear which will grow rapidly until the mixture is milk white. Soon the odor of sulphur dioxide will appear and yellow elemental sulphur may be seen on the top of the mixture. The reaction is in two steps as follows:

Reaction 1. $ZnSO_4 + Na_2S_2O_3 + H_2O = ZnS + Na_2SO_4 + H_2SO_4$

Reaction 2. $H_2SO_4 + Na_2S_2O_3 = Na_2SO_4 + SO_2 + S + H_2O$

With continued boiling the reaction will progress until practically all of one or the other reactants have been consumed. In order to prevent the unnecessary consumption of the thiosulphate, the evolution of sulphur dioxide gas and the formation of sulphur, a base may be added to neutralize the sulphuric acid of Reaction 1. To do this a base, such as a saturated solution of sodium carbonate, must be added at a rate chemically equivalent to the rate of the formation of the acid in order that the acidity or pH of the solution will not be altered radically. If this is done, the following reaction takes place:

Reaction 3. 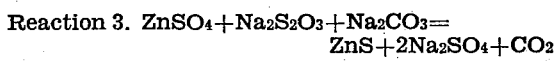
$$ZnS + 2Na_2SO_4 + CO_2$$

The zinc sulphide thus formed can be filtered easily and if washed and dried produces a soft white powder with pigment properties. If examined under the microscope, it exhibits an exceptional uniformity of particle size, shape and crystalline form, and if the conditions of precipitation have been favorable, the particle size will be such that this pigment, without calcination or other treatment, will have a color strength equal to that of high strength calcined lithopones. In chemical analysis it will be found that the product is a slightly basic, hydrated zinc sulphide having a zinc content of from 60 to 64%.

Chemical analysis also indicates that the combined sulphur of the precipitate prepared as herein described always lacks from between 2 and 3% of being equivalent to total zinc of the precipitate. This indicates the product to be a basic zinc sulphide. This is probably caused by a side reaction between the soluble zinc salt and the base being added for neutralization, but there is evidence that it is a definite chemical compound and not just simply a mixture of the zinc sulphide and the zinc hydroxide, since if attempts are made to dissolve the $Zn(OH)_2$ with ammonia or an excess of ammonium chloride or sulphate there is no change in the chemical composition of the precipitate. Furthermore, the exceptional color strength of the crude pigment is due in part to the basic character of the precipitate, for if the $Zn(OH)_2$ is removed with dilute acid the color strength of the resulting product is reduced.

In carrying out my invention, I maintain the pH of the solution substantially constant at a point where very little or no thiosulphate will be decomposed as shown in Reaction 2, indicated above. Preferably I maintain the pH of the solution substantially constant by immersing in the precipitation tank two metallic electrodes, one of pure zinc and one of pure antimony, the electrodes being connected with suitable wires to a potentiometer. When the zinc sulphate solution is brought to a boiling point in the tank, these electrodes show an E. M. F. of about 650 millivolts. When the boiling thiosulphate solution is added the E. M. F. moves rapidly up to 750 mv. A saturated sodium carbonate solution, or other appropriate base, is then added at a rate to slowly reduce the E. M. F. to about 700 mv. and it is held there throughout the precipitation by running the solution of the base into the tank at the proper rate. An E. M. F. of less than 600 mv. produces a pigment of poor color strength, and an E. M. F. of 750 mv. or above, results in an unnecessary decomposition of thiosulphate by the free acid. A slight decomposition of the thiosulphate to produce about 2% sulphur in the precipitate is desirable if the product is to be calcined as hereinafter described.

The present invention makes possible the control of the particle size of the precipitate within wide limits. With this object in view zinc sulphide nuclei are established in the mixture during the induction period by means of sulphide ions. Other foreign substances constituting nuclei upon which the sulphide may precipitate may be used. A small amount of soluble sulphide, such as sodium sulphide, may be added to the thiosulphate solution just before it is mixed with the zinc sulphate solution, so that a colloidial zinc sulphide is precipitated at once when the solutions are mixed. These colloidial particles of zinc sulphide form nuclei upon which most of the zinc sulphide subsequently precipitated plates out, thereby building up the particle by crystallization and not by aggregation as is the case when all the zinc is precipitated by sulphide ion. The reaction is relatively slow. For example, at the beginning of a precipitation when the reaction is most rapid between 1 and 3 grams of zinc sulphide are precipitated per minute per liter of mixture. A rate of precipitation between 1 and 1.5 grams per minute per liter is preferred in order to produce a pigment of maximum color strength. If the sodium thiosulphate solution (about 35° Bé.) contains more than 200 mg. per liter of sulphide ion at the beginning of the precipitation, the particles will be very small, in the neighborhood of .15 micron in diameter, will settle slowly, filter with some difficulty and have a poor color strength. Also, if only 10 mg. per liter of sulphide ion is used, a product with large particle size will be obtained which will settle and filter very rapidly, but will have poor color strength. Preferably about 50 mg. per liter of sulphide ion for thiosulphate solutions of about 35° Bé. is used. This produces a color strength in the finished product equal to that of high strength calcined lithopones.

A variety of particle sizes of the product may be produced by adding a small amount of soluble sulphide to the neutralizing solution, which neutralizing solution is added at a regular rate during the time of precipitation, and if the nuclei forming sulphide is present, new nuclei will be formed and a variety of particle sizes in the product produced.

If desired, extremely large particles that result in a product of very low color strength may be obtained by continuing to add, after precipitation is about half completed, additional and chemically equivalent quantities of the zinc sulphate and sodium thiosulphate solutions from time to time until the desired particle size is built up.

The following example is given to illustrate in detail my invention, but it is to be expressly understood that such example is for the purpose of illustration only and that the invention is not limited to the exact proportions and conditions specified therein:

A concentrated zinc sulphate solution is prepared by well known methods, which should contain about 160 grams of zinc per liter and be free of chlorides. A concentrated sodium thiosulphate solution is prepared from the commercial salt. It should be free of chlorides and of a density of about 35° Bé. In order to remove any iron or heavy metals or sulphites, this solution should be heated to 180° F. or above, and treated with just enough sodium polysulphide to give it a faint yellow tone. The solution should then be clarified by any suitable means and is ready for use. Preferably an analysis should be made just prior to use to determine the total thiosulphate and sulphide content.

About 40 gallons of the zinc sulphate solution is placed in an agitator tank equipped with heating coils and provided with zinc and antimony electrodes and a potentiometer and heated to boiling. In a separate tank a quantity of sodium thiosulphate solution, in amount the exact chemical equivalent of the zinc sulphate solution (about 30 gallons) is heated to boiling. Sodium sulphide in an amount sufficient to bring the sulphide content of the solution to about 50 mg. per liter and sodium sulphite enough to equal 100 mg. per liter is now added to the boiling thiosulphate solution. The boiling thiosulphate solution is now dumped into the agitator tank with the zinc sulphate solution as quickly as possible, agitation begun and the boiling continued. An agitator of the propeller type running at high speed is preferred. From a third tank a hot saturated solution of sodium carbonate should be run into the agitator tank as soon as the E. M. F. of the zinc and antimony electrodes shows 750 mv., and this sodium carbonate solution should be continued to be supplied throughout the precipitation at a rate that will maintain the E. M. F. of the electrodes between 680 and 700 mv. After an hour's time the rate of reaction will begin to slow down, as indicated by the rate at which the sodium carbonate must be added. The addition of the sodium carbonate solution and the agitation should be continued for about six hours, or until the reaction is complete, which will be indicated by the fact that the voltage remains constant for a few minutes without the addition of the sodium carbonate solution.

The slurry in the agitator tank now consists of a precipitate of zinc sulphide suspended in an almost saturated solution of sodium sulphate. This slurry should be diluted with water to make sure that no anhydrous sodium sulphate has crystallized out with the zinc sulphide. Preferably the slurry is filtered at once and the cake washed in the press until it is as free of sulphates as possible. The cake is then removed, re-pulped in water and re-filtered. A second washing in the press may be desirable to remove the last traces of water-soluble salts. The filtered cake is then dried at about 180° F. and the product is ready for use as a paint pigment without further treatment. It possesses the whiteness, brightness and color strength of present day high strength calcined lithopones, has hiding power and durability and is unique in the field of white pigments inasmuch as heretofore it has not been possible to obtain these desirable qualities in a precipitated zinc sulphide without resorting to the additional steps of calcining, wet grinding, washing, filtering and drying.

The pigment produced by the method as thus far described is one of excellent quality having a combined zinc oxide content of between two and five percent and capable of use as a paint pigment without further treatment. Furthermore, it has been discovered that by the simple step of dehydrating this pigment, a paint pigment of a color strength exceeding that of any known zinc sulphide and approximating that of titanium dioxide may be secured. This is rendered possible by reason of the particle size, uniformity of size and crystalline form of the pigment. Moreover, since this uncalcined zinc sulphide pigment is sensitive to light if precipitated in the presence of chlorides, and in this respect differs from other uncalcined zinc sulphides, it is advisable, in preparing the product, to use precipitating solutions that are practically free from chlorides.

As indicated above, it has heretofore been necessary in order to develop in crude zinc sulphide pigments the properties of color, brightness, color strength, texture, oil absorption and grinding properties to calcine the zinc sulphide. The properties indicated are developed 1, largely by dehydration of the crude zinc sulphide and 2, by the sintering together of aggregates to form larger particles, and possibly by the formation of larger particles at the expense of the colloidal fines by crystal growth, the zinc sulphide passing from the smaller to the larger particles through the vapor phase. The dehydration step takes place rapidly and at low temperatures, possibly below 1025° F., but the latter step (2) requires that the product be maintained at much higher temperatures, 1150° F. to 1475° F. for from one to six hours, and the material so calcined becomes hard and gritty, requires quenching while still hot, and expensive wet grinding to produce a suitable product for use as a pigment. On the other hand, if the improved basic zinc sulphide of the present invention is to be calcined, only two essential steps are necessary, and these steps can be accomplished at relatively low temperatures and in a short space of time. It is only necessary to sulphidize the small percentage of zinc hydroxide in the zinc sulphide pigment and to dehydrate or drive out the greater part of the water of hydration of the pigment. The particle size of the pigment is properly developed in the precipitating step above described, and calcining for that purpose is unnecessary. The sulphidized and dehydrated product requires no quenching, wet grinding or chemical treatment and is ready for use as a pigment after cooling. The preferred method of procedure is as follows:

A small quantity of elemental sulphur is added to the zinc sulphide precipitate hereinbefore described. This may be done by conducting the precipitation at a pH such that the requisite amount of sulphur is produced by the decomposition of thiosulphate, or it may be added as a powder to the wet pulp before filtering, or to the dried cake after filtering. In any case an amount slightly in excess of the theoretical amount necessary to sulphidize the zinc hydroxide present in the pigment should be added.

This mixture is then conducted through a suitable muffle in such a manner as to exclude air or oxygen and provide the conditions of time and temperature herein specified. There should be provided in the furnace or muffle three zones, a preheating zone, a zone of maximum temperature and a cooling zone. The preheating zone may be of any convenient length and maintained at a temperature that will permit the pigment to be quickly raised to the maximum temperature in the maximum temperature zone. The pigment should be passed through this latter zone in a relatively short period of time. The cooling zone should be such that the charge entering from the zone of the maximum temperature may be cooled to about 390° F. before leaving the muffle. The product may pass directly from the muffle to a small pulverizer and is then ready for use.

The time that the charge is in the zone of maximum temperature, and the temperature of the zone as well, may vary between wide limits, but there is a definite relationship between the time and temperature which should be maintained. In general, the temperature in the maximum zone should not be less than 930° F. nor more than 1400° F. If for any reason, such as the nature of the calcining facilities available, a temperature from 930° F. to 1025° F. is necessary, then a retention in the zone of maximum temperature of from 100 to 120 minutes will be required to sufficiently sulphidize and dehydrate the product and produce a high color strength. On the other hand, if facilities provide for high temperature muffling, for example, 1400° F., then a retention of not more than three minutes in the maximum temperature zone is sufficient. To obtain low oil absorption, the higher temperature is preferred, and maximum whiteness and brightness are not obtained at temperatures below 1025° F. Short periods of time in the high temperature zone will provide maximum color strength only when the optimum particle size has been developed in the precipitation step heretofore described.

Extremely high oil absorption can be obtained by providing particle sizes smaller than the optimum in which case the maximum color strength can be obtained by muffling for long periods of time, but in such case the color strength will not equal that obtained in the optimum particle size as provided by precipitation. There is thus provided means for producing zinc sulphide with a wide range of oil absorptions and at the same time retain the ease with which the pigment is incorporated in oil and its texture, color and brightness.

Because of the short time of calcining and because the zinc sulphide has a very uniform particle size, shape and crystalline form, and because the uncalcined product is so easily and completely washed free from water-soluble salts, the calcined product is practically free from soluble salts and is neutral chemically. The product shows exceptional durability when used as a pigment in outside paints due to the fact that the particles are single crystals of the proper size and uniformity to produce the greatest durability.

It should be understood that although it is preferred to add sulphidizing sulphur as a solid to the precipitate prior to calcining, this sulphur can be readily provided in a vapor phase by introducing sulphur vapors or hydrogen sulphide gas to the preheating zone of the furnace.

It will be understood by those skilled in the art that certain modifications and variations may be introduced into the method herein described without departing from the spirit of the invention as defined in the claims, and such modifications and variations as fall within the terms of the claims are intended to be covered thereby.

Having thus described the invention, what is claimed is:

1. The process of precipitating a basic zinc sulphide, comprising treating a zinc sulphate solution with a water soluble thiosulphate and adding a base at a rate equivalent to the rate of reaction between the zinc and thiosulphate.

2. The process of precipitating a basic hydrated zinc sulphide comprising treating a zinc sulphate solution with a solution of sodium thiosulphate and maintaining an approximately constant pH slightly above the pH at which the sodium thiosulphate would be decomposed by free sulphuric acid.

3. The process of precipitating a basic hydrated zinc sulphide comprising treating a zinc sulphate solution with a solution of sodium thiosulphate and adding an alkali base at a rate to maintain a pH slightly above the pH at which the sodium thiosulphate would be decomposed by free sulphuric acid.

4. The process of making a zinc sulphide pigment which comprises treating a hot concentrated solution of a zinc salt with a hot concentrated solution of a water-soluble thiosulphate and adding a base at a rate equal to the rate of reaction between the zinc and the thiosulphate.

5. The process of making a zinc sulphide pigment which comprises treating a concentrated boiling zinc sulphate solution with a boiling concentrated solution of sodium thiosulphate containing sulphide ions to the extent of from ten to one hundred milligrams per liter, agitating while adding a hot solution of sodium carbonate at a rate to maintain a substantially constant pH in the solution at a point above that at which the thiosulphate would be decomposed until the reaction is complete, and then washing the resulting precipitate until free of soluble salts, and filtering and drying the precipitate.

6. The process of making a zinc sulphide pigment which consists in preparing a strong boiling solution of zinc sulphate, mixing the same with a strong boiling solution of sodium thiosulphate containing from ten to one hundred milligrams of sulphide ion per liter and not more than one hundred milligrams per liter of sodium sulphite, agitating the mixture while maintaining a temperature above 200° F., whereby sulphuric acid will be formed, continuously adding an alkali base at a rate to maintain the acid content of the solution below the point where sodium thiosulphate is appreciably decomposed by the acid, washing the resulting precipitate until free of soluble salts, and then filtering and drying the precipitate.

7. The process of making a zinc sulphide pigment which comprises rapidly mixing boiling concentrated solutions of zinc sulphate and sodium thiosulphate with vigorous agitation, maintaining the temperature of the mixture above 180° F., adding an alkali base at a rate that will maintain a potential of between 600 and 800 mv. between an electrode of pure zinc and an electrode of pure antimony immersed in the mixture, and maintaining these conditions until the reaction is substantially complete.

8. The process of making a zinc sulphide pigment which consists in rapidly mixing a boiling zinc sulphate solution of 35 to 40° Bé. with a chemically equivalent volume of a boiling sodium thiosulphate solution of 35 to 40° Bé. and containing not more than 100 milligrams per liter of sulphite ion and between ten and one hundred milligrams per liter of sulphide ion, vigorously agitating and maintaining the temperature of the mixture above 210° F., and adding continuously during the reaction a hot solution of sodium carbonate at a rate that will maintain a potential of approximately 700 mv. between electrodes of zinc and antimony when immersed in the mixture.

9. The process of making a zinc sulphide pigment which consists in mixing hot solutions of zinc sulphate and sodium thiosulphate, agitating the mixture while maintaining the temperature thereof above 180° F., adding an alkali base at a rate approximately equal to the rate of formation of zinc sulphide, and when the reaction is partially completed adding from time to time equivalent amounts of zinc sulphate and sodium thiosulphate solutions while continuing the addition of the alkali base, whereby a pigment of large particle size may be secured.

10. The process of making a zinc sulphide pigment which consists in mixing a hot solution of zinc sulphate and a hot solution of a water soluble thiosulphate containing a small amount of sodium sulphide, agitating the mixture while maintaining a temperature of approximately 200° F., adding an alkali base containing a small amount of alkali sulphide at a rate substantially equal to the rate of precipitation to maintain a substantially constant acidity in the mixture, and continuing until the reaction is complete.

11. The process of making a zinc sulphide of a composite character, which consists in mixing hot solutions of zinc sulphate and a water soluble thiosulphate and a small amount of a foreign substance constituting nuclei upon which the zinc sulphide may precipitate, agitating the mixture while maintaining a temperature above 180° F., adding a base at a rate substantially equal to the rate of precipitation to maintain a substantially constant pH in the mixture and continuing the addition of the base and the agitation until the reaction is complete.

12. The process of making a zinc sulphide pigment which comprises treating a concentrated boiling zinc sulphate solution with a boiling concentrated solution of sodium thiosulphate containing sulphide ions to the extent of from ten to one hundred milligrams per liter, agitating while adding a hot solution of sodium carbonate at a rate to maintain a substantially constant pH in the solution at a point above that at which the thiosulphate would be decomposed until the reaction is complete, washing the resulting precipitate until free of soluble salts, and filtering the precipitate, and then sulphidizing any contained zinc hydroxide and dehydrating the pigment.

13. The process of making a zinc sulphide pigment which consists in treating a concentrated boiling zinc sulphate solution with a concentrated boiling solution of sodium thiosulphate containing sulphide ions to the extent of from ten to one hundred milligrams per liter, agitating while adding a hot solution of sodium carbonate at a rate to maintain a substantially constant pH in the mixture until the reaction is complete at a point above that at which the thiosulphate would be decomposed, washing the resulting precipitate until free of soluble salts, filtering and drying the precipitate, and then calcining the precipitate in the presence of elemental sulphur.

14. The process of making a zinc sulphide pigment which consists in preparing a strong boiling solution of zinc sulphate, mixing the same with a strong boiling solution of a water soluble thiosulphate containing from ten to one hundred milligrams of sulphide ion per liter and not more than one hundred milligrams per liter of sodium sulphite, agitating the mixture while maintaining a temperature above 200° F., whereby sulphuric acid will be formed, continuously adding an alkali base at a rate to maintain the acid content of the solution below the point where sodium thiosulphate is appreciably decomposed by the acid, washing the resulting precipitate until free of soluble salts, filtering and drying the precipitate, and then calcining the precipitate in the presence of elemental sulphur to convert any zinc hydroxide into zinc sulphide and eliminate water of hydration.

15. The process of making a zinc sulphide pigment which comprises rapidly mixing boiling concentrated solutions of zinc sulphate and sodium thiosulphate with vigorous agitation, maintaining a temperature of the mixture above 180° F., adding an alkali base at a rate that will maintain a potential of between 600 and 800 mv. between an electrode of pure zinc and an electrode of pure antimony immersed in the mixture, and maintaining these conditions until the reaction is substantially complete, washing, filtering and drying the precipitate, and then calcining the same in the presence of elemental sulphur to convert any zinc hydroxide into zinc sulphide and eliminate water of hydration.

16. The process of making a zinc sulphide pigment which consists in rapidly mixing a boiling zinc sulphate solution of 35 to 40° Bé. with a chemically equivalent volume of a boiling sodium thiosulphate solution of 35 to 40° Bé. and containing not more than 100 milligrams per liter of sulphite ion and between ten and one hundred milligrams per liter of sulphide ion, vigorously agitating and maintaining the temperature of the mixture above 210° F., adding continuously during the reaction a hot solution of sodium carbonate at a rate that will maintain a potential of approximately 700 mv. between electrodes of zinc and antimony when immersed in the mixture, washing, filtering and drying the precipitate and then calcining the same in the presence of elemental sulfur to convert any zinc hydroxide into zinc sulphide and eliminate water of hydration.

17. The process of making a zinc sulphide pigment which consists in treating a concentrated boiling zinc sulphate solution with a concentrated boiling solution of sodium thiosulphate containing sulphide ions to the extent of from ten to one hundred milligrams per liter, agitating while adding a hot solution of sodium carbonate at a rate to maintain a substantially constant pH in the mixture at a point above that at which the thiosulphate would be decomposed until the reaction is complete, washing the resulting precipitate until free of soluble salts, filtering and drying the precipitate, and then calcining the precipitate at a temperature of approximately 1200° F. in the absence of oxygen and in the presence of elemental sulphur.

18. The process of making a zinc sulphide pigment which consists in preparing a strong boiling solution of zinc sulphate, mixing the same with a strong boiling solution of a water soluble thiosulphate containing from ten to one hundred milligrams of sulphide ion per liter and not more than one hundred milligrams per liter of sodium sulphite, agitating the mixture while maintaining a temperature above 200° F., whereby sulphuric acid will be formed, continuously adding an alkali base at a rate to maintain the acid content of the solution below the point where sodium thiosulphate is appreciably decomposed by the acid, washing the resulting precipitate until free of soluble salts, filtering and drying the precipitate, and then calcining the precipitate at a temperature of approximately 1200° F. for about ten minutes in the absence of oxygen and in the presence of elemental sulphur to convert any zinc hydroxide into zinc sulphide and eliminate water of hydration.

19. The process of making a zinc sulphide pigment which comprises rapidly mixing boiling concentrated solutions of zinc sulphate and sodium thiosulphate with vigorous agitation, maintaining a temperature of the mixture above 180° F., adding an alkali base at a rate that will maintain a potential of between 600 and 800 mv. between an electrode of pure zinc and an electrode of pure antimony immersed in the mixture, maintaining these conditions until the reaction is substantially complete, washing, filtering and drying the precipitate, and then calcining the same at a temperature of approximately 1200° F., for about ten minutes in the absence of oxygen and in the presence of elemental sulphur to convert any zinc hydroxide into zinc sulphide and eliminate water of hydration.

20. The process of making a zinc sulphide pigment which consists in rapidly mixing a boiling zinc sulphate solution of 35 to 40° Bé. with a chemically equivalent volume of a boiling sodium thiosulphate solution of 35 to 40° Bé. and containing not more than 100 milligrams per liter of sulphite ion and between ten and one hundred milligrams per liter of sulphide ion, vigorously agitating and maintaining the temperature of the mixture above 210° F., adding continuously during the reaction a hot solution of sodium carbonate at a rate that will maintain a potential of approximately 700 mv. between electrodes of zinc and antimony when immersed in the mixture, washing, filtering and drying the precipitate, and then calcining the same at a temperature of approximately 1200° F. for about ten minutes in the absence of oxygen and in the presence of elemental sulphur to convert any zinc hydroxide into zinc sulphide and eliminate water of hydration.

21. The process of making a zinc sulphide pigment which consists in rapidly mixing a boiling zinc sulphate solution of 35 to 40° Bé. with a chemically equivalent volume of a boiling sodium thiosulphate solution of 35 to 40° Bé. and containing not more than one hundred milligrams per liter of sulphite ion and between ten and one hundred milligrams per liter of sulphide ion, vigorously agitating and maintaining the temperature of the mixture above 210° F., adding continuously during the reaction a hot solution of sodium carbonate at a rate that will maintain a potential of approximately 700 mv. between electrodes of zinc and antimony when immersed in the mixture, and then calcining the same at a temperature of from 950° F. to 1400° F. for a period ranging from 120 minutes down to 3 minutes (the time decreasing with temperature increase) whereby water of hydration is eliminated without materially increasing the particle size of the pigment.

22. The process of making a zinc sulphide pigment which consists in rapidly mixing a boiling zinc sulphate solution of 35 to 40° Bé. with a chemically equivalent volume of a boiling sodium thiosulphate solution of 35 to 40° Bé. and containing not more than one hundred milligrams per liter of sulphite ion and between ten and one hundred milligrams per liter of sulphide ion, vigorously agitating and maintaining the temperature of the mixture above 210° F., adding continuously during the reaction a hot solution of sodium carbonate at a rate that will maintain a potential of approximately 700 mv. between electrodes of zinc and antimony when immersed in the mixture, and then calcining the same at a temperature of from 950° F. to 1400° F. for a time sufficient to eliminate water of hydration without materially increasing the particle size of the pigment.

23. As a new article of manufacture, a precipitated zinc sulphide pigment consisting mainly of individual crystals of substantially uniform size and shape as precipitated and characterized by having the color strength, combined with whiteness and brightness, comparable to titanium dioxide.

24. As a new article of manufacture, a precipitated basic hydrated zinc sulphide pigment with a combined zinc oxide content of from two to five per cent.

25. As a new article of manufacture, a precipitated basic hydrated zinc sulphide having a combined zinc oxide content of from two to five per cent, and the primary particles consisting of individual crystals of substantially uniform size and shape.

26. In a process for making zinc sulphide pigment by precipitation from a mixture of reacting solutions, the step of introducing colloidial zinc sulphide into one of the solutions before the mixture of said solutions, whereby the particle size of the precipitate may be controlled.

JOHN HENRY CALBECK.